United States Patent
Henkel et al.

(10) Patent No.: US 6,791,301 B2
(45) Date of Patent: Sep. 14, 2004

(54) DEVICE FOR CONTROL OF THE EXCITATION CURRENT FOR A THREE PHASE GENERATOR

(75) Inventors: Achim Henkel, Reutlingen (DE); Reinhard Milich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 10/030,507

(22) PCT Filed: Mar. 29, 2001

(86) PCT No.: PCT/DE01/01272
§ 371 (c)(1),
(2), (4) Date: Jan. 9, 2002

(87) PCT Pub. No.: WO01/95475
PCT Pub. Date: Dec. 13, 2001

(65) Prior Publication Data
US 2003/0006740 A1 Jan. 9, 2003

(30) Foreign Application Priority Data
Jun. 7, 2000 (DE) .......................... 100 28 135

(51) Int. Cl.$^7$ ........................... H02H 7/06; H02P 11/00; H02P 9/00; H02P 9/14
(52) U.S. Cl. ........................................... 322/46; 322/28
(58) Field of Search .............................. 322/46, 22, 24, 322/28, 26

(56) References Cited
U.S. PATENT DOCUMENTS

| | | | | |
|---|---|---|---|---|
| 3,996,507 A | * | 12/1976 | Chambers | .................... 322/20 |
| 4,288,737 A | * | 9/1981 | McClain et al. | ............. 323/254 |
| 4,670,705 A | | 6/1987 | Sievers | |
| 5,523,672 A | * | 6/1996 | Schramm et al. | .............. 322/25 |
| 5,602,470 A | * | 2/1997 | Kohl et al. | .................. 324/177 |
| 5,726,558 A | * | 3/1998 | Umeda et al. | ................. 322/27 |
| 6,147,474 A | * | 11/2000 | Koss et al. | .................... 322/59 |
| 6,163,138 A | * | 12/2000 | Kohl et al. | .................... 322/28 |
| 6,351,104 B1 | * | 2/2002 | Koelle et al. | .................. 322/22 |
| 6,373,230 B2 | * | 4/2002 | Jabaji | ........................... 322/28 |
| 6,420,855 B2 | * | 7/2002 | Taniguchi et al. | ............. 322/28 |

FOREIGN PATENT DOCUMENTS

| | | | |
|---|---|---|---|
| DE | WO9006616 A1 | * | 6/1990 |
| DE | 4115338 A1 | * | 11/1992 |
| DE | 197 32 961 A | | 2/1999 |

\* cited by examiner

Primary Examiner—Burton S. Mullins
Assistant Examiner—Julio Gonzalez
(74) Attorney, Agent, or Firm—Michael J. Striker

(57) ABSTRACT

The invention relates to an apparatus for regulating the exciter current for a rotary-current generator. It has a voltage source, a rectifier, three phase windings, an evaluation unit, and a voltage regulator. The evaluation unit has three input terminals, and each of these input terminals is connected to one of the phase windings. The evaluation unit is intended for evaluating the phase voltages derived from the three phase windings, in order to detect error functions of the rectifier and/or of the phase windings. If such unauthorized work states are detected, then via the voltage regulator, the exciter current flowing through the exciter winding is reduced.

4 Claims, 1 Drawing Sheet

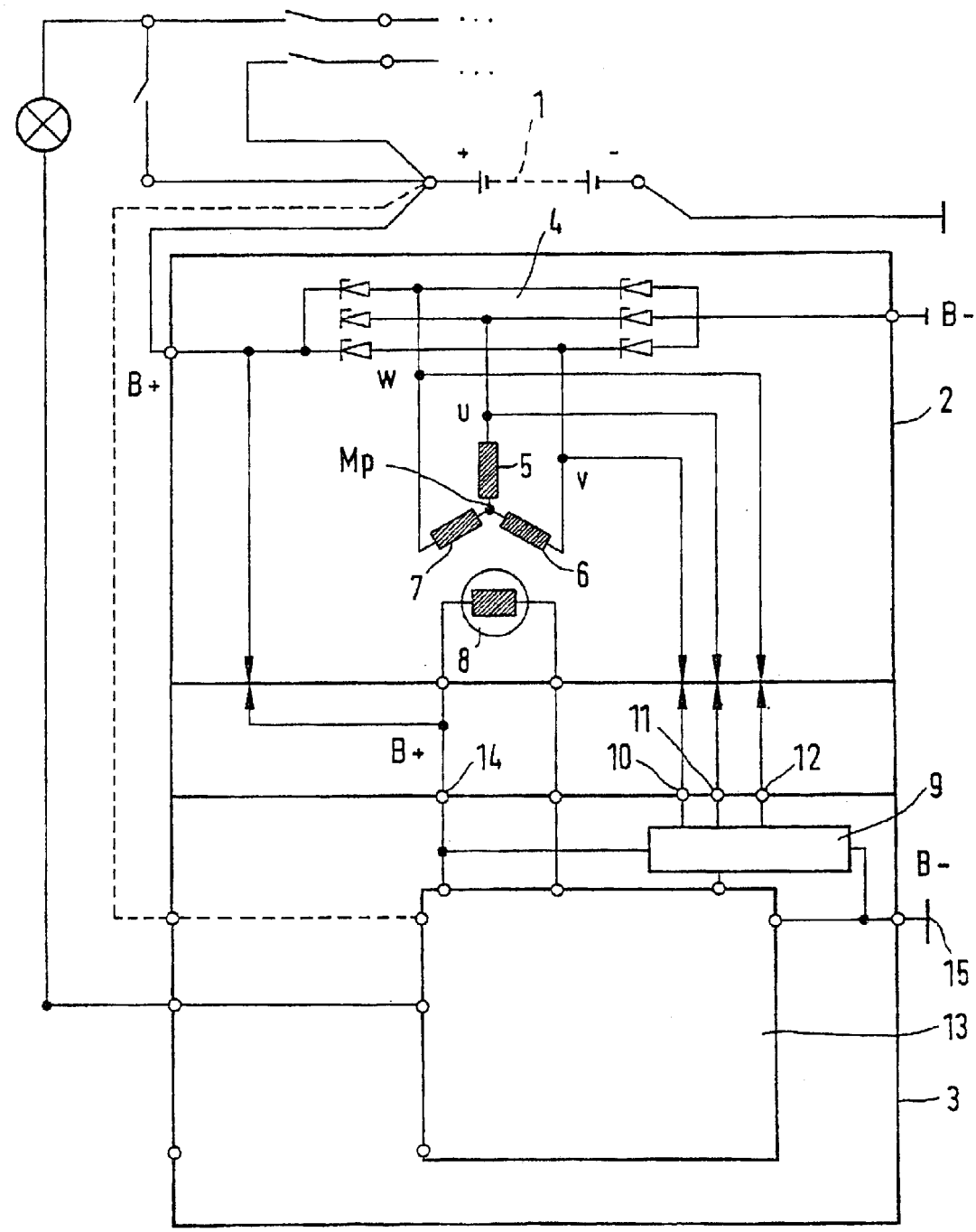

DEVICE FOR CONTROL OF THE EXCITATION CURRENT FOR A THREE PHASE GENERATOR

BACKGROUND OF THE INVENTION

The invention is based on an apparatus for regulating the exciter current for a rotary-current generator having the characteristics recited in the preamble to claim 1. One such apparatus is known from German Patent Disclosure DE 197 32 961 A1 of the present applicant. This reference describes a voltage regulator for a rotary-current generator that has phase windings and one exciter winding. In this known case, means are also provided for detecting and evaluating one of the phase voltages, and the regulation of the exciter current flowing through the exciter winding is effected as a function of the detected phase voltage, among other factors. The evaluation of the phase signal is effected using a window comparator; the upper and lower thresholds are each varied in such a way that when the voltage is increasing, an attainment of the upper threshold leads to an increase in the thresholds, and when the voltage is dropping and the lower threshold is reached, the thresholds are lowered. Both switching points are used to form a frequency-dependent evaluation signal, and from the frequency thus ascertained, the rpm of the generator is ascertained. This makes it possible, among other things, to detect quickly whether the generator is still stopped or is turning, so that immediately after the onset of rotation, a shift can be made from the preexcitation to the actual regulated state.

SUMMARY OF THE INVENTION

The apparatus according to the invention having the characteristics of claim 1 has the advantage over the known apparatus that by the claimed evaluation of all three phase voltages, conclusions can be drawn as to whether error functions of the rectifier and the stator windings are present. Assuring the correct functioning of the rectifier and stator windings prevents uncontrolled performance and possible overheating of the system. This makes early detection of a risk potential for the generator and for the system adjacent to it possible by means of the invention. Severe consequent damage that could arise from an extreme heat development are thus prevented.

These advantages are attained by the use of an evaluation unit which has three input terminals, each of these input terminals being connected to one of the phase windings of the rotary-current generator. The evaluation unit evaluates all three phase voltages for amplitude and/or frequency, so that significant deviations from the desired behavior can be detected. If such significant deviations occur, then via the voltage regulator of the generator, the load on the exciter winding can be limited to a harmless amount. Consequently, according to the invention, if the presence of limited function of the rectifier and stator is detected, an overload with consequent damage to the generator and the surrounding modules is counteracted.

BRIEF DESCRIPTION OF THE DRAWING

One exemplary embodiment for the invention is shown in the drawing and will be explained in further detail in the ensuing description.

DESCRIPTION OF THE PREFERRED EMBODIMENT

In the drawing, a rotary-current generator 2 is connected to a battery 1. Also connected to the rotary-current generator 2 is regulator 3, which has an integrated evaluation unit 9 and a regulating unit 13.

The phase windings 5, 6, 7 of the rotary-current generator are connected to one another via a common center point $M_p$. A delta connection of the stator phases is also conceivable. The phase windings 5, 6, 7 are also connected to the Zener diodes of a rectifier bridge 4 via terminals u, v, w. The rectifier bridge 4 is connected to the positive pole of the battery 1 via the terminal B+ and to the negative pole of the battery 1 or to ground via the terminal B−. The phase voltages U, V, W occur at the phase windings 5, 6, 7. An exciter winding 8 is also part of the rotary-current generator 2.

The phase voltages U, V, W are used for detecting possible error functions of the rectifier 4 and of the phase windings 5, 6, 7. Pickup points v, u, w are therefore provided in front of the phase windings; they are connected via signal lines to the input terminals 10, 11, 12 of the evaluation unit 9.

In the evaluation unit 9, an evaluation of the signals derived from the three phase windings is performed with reference to the battery potential B+ and with reference to the ground potential B−. To that end, the evaluation unit 9 has a fourth input 14 and a terminal 15; the battery potential B+ is present at the input 14, and ground potential is present at the terminal 15. The result of this evaluation is delivered to the regulating unit 13, which triggers the exciter winding 8 via the output 16 of the regulator 3.

If the evaluation in the evaluation unit 9 shows that significant deviations from the desired behavior exist, then this is considered to be the presence of a limited function of the rectifier and/or of one of the phase windings, and the load on the exciter winding is reduced via the voltage regulator to a harmless amount; that is, the current flowing through the exciter winding is reduced. This counteracts consequent damage to the generator and to modules adjacent to it.

What is claimed is:

1. An apparatus for regulating the exciter current for a rotary-current generator, having
   a voltage source,
   a rectifier connected to the voltage source,
   three phase windings connected to the rectifier,
   one evaluation unit connected to one phase winding, and
   one voltage regulator, whose input is connected to the evaluation unit and whose output is connected to the exciter winding of the rotary-current generator,
   wherein
   the evaluation unit (9) has three input terminals (10, 11, 12), and each of these input terminals is connected to one of the phase windings (5, 8, 7) of the rotary-current generator (2);
   the evaluation unit (9) is intended for evaluating the phase voltages associated with the three phase windings; In order to detect unauthorized work states and therefore to detect error functions of the rectifier or error functions of the phase windings; and
   the voltage regulator (3) in response to detecting unauthorized work states reduces the exciter current flowing through the exciter winding (8).

2. The apparatus of claim 1, wherein the evaluation unit (9) is a component of the voltage regulator (3).

3. The apparatus of claim 1, wherein the evaluation unit (9) has a fourth input terminal (14), which is connected to the positive pole of the voltage source (1), and that the evaluation unit has one terminal (16) connected to ground potential.

4. The apparatus of claim 1, wherein the evaluation unit evaluates all three phase voltages for amplitude and/or frequency.

* * * * *